March 22, 1955     P. J. TYLER ET AL     2,704,685

DEVICE FOR PLANTING SEEDS IN SEED BEDS

Filed Aug. 24, 1949     2 Sheets-Sheet 1

Inventors
Paul J. Tyler
Jay F. Wickham by

Attorneys.

March 22, 1955  P. J. TYLER ET AL  2,704,685
DEVICE FOR PLANTING SEEDS IN SEED BEDS
Filed Aug. 24, 1949  2 Sheets-Sheet 2
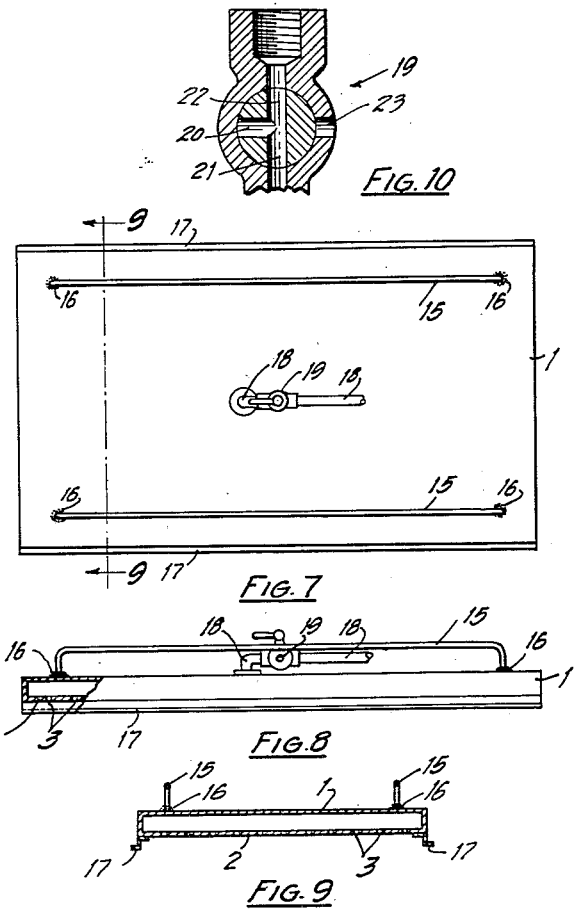
INVENTOR.
Paul J. Tyler
Jay F. Wickham
BY
ATTORNEYS

United States Patent Office 2,704,685
Patented Mar. 22, 1955

2,704,685
DEVICE FOR PLANTING SEEDS IN SEED BEDS

Paul J. Tyler and Jay F. Wickham, Stamford, N. Y.

Application August 24, 1949, Serial No. 112,154

3 Claims. (Cl. 294—65)

Our invention relates to planting and particularly to a device for planting seeds in seed beds or flats.

Many vegetables, for example, are started by planting seeds in a specially prepared and protected seed bed or flat at a date much earlier than they could be planted outside. The seeds germinate in the seed bed and the plants grow therein until temperatures outside become sufficiently warm and stable to permit the young plants to be removed from the seed beds or flats and transplanted in the soil outside where they are to grow to maturity.

The placing of the seeds in the seed bed or flat at uniformly spaced distances from each other to insure that they will germinate and grow uniformly is a tedious operation and, where the seeds are scattered more or less indiscriminately over the seed bed or flat and covered with soil, the results are not particularly satisfactory because the plants do not grow uniformly where crowded together and a great deal of seed is wasted.

The principal objects of our invention are to provide a device whereby seeds may be planted quickly and uniformly in a seed bed or flat at a minimum cost by way of labor, in which no seeds are wasted, and in which the seeds when planted are disposed at uniform, optimum distances apart so that each seed will have an equal chance of germinating and producing plants of substantially uniform size.

We accomplish these objects by means of the novel elements and the combinations and arrangements thereof described below and illustrated in the accompanying drawing in which—

Fig. 7 is a plan view of our preferred type of device showing that side thereof which is on top when the seeds are deposited on the seed bed or flat;

Fig. 8 is a front elevation view of Fig. 7 with portions broken away;

Fig. 9 is a section of Fig. 7 in the plane 7—7; and

Fig. 10 is a cross section through a slightly different type of valve from that shown in Figs. 4, 5 and 6.

Referring to the drawings—

Our seeder comprises a flat, rectangular, metal box 1 which may be formed of comparatively light sheet metal and which is air tight except for a pipe which communicates with the interior thereof, and the perforations mentioned below in one side thereof. The box 1 may be made of any desired size although it should be light enough to be easily handled. One of the larger sides 2 forming the top of the box is provided with a multiplicity of comparatively small perforations 3, smaller than the seeds to be planted, which are preferably equally spaced both longitudinally and transversely of said top. The distance between the holes depends somewhat upon the seeds to be planted and they should be spaced apart the minimum optimum distance to provide good germination for the seeds and growth of the plants to the desired size before transplanting.

Figure 1:
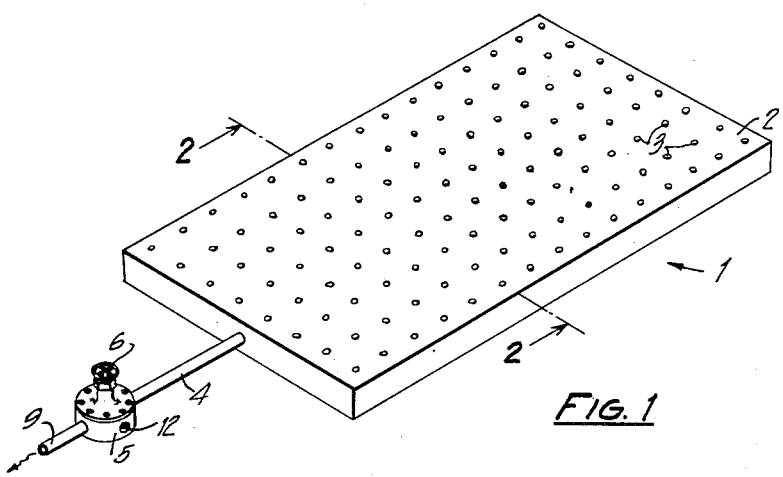
Fig. 1 is a perspective view of our seeder.
Figure 6:
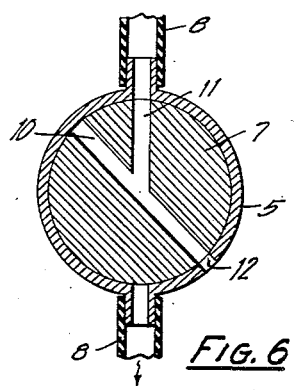
Figs. 5 and 6 are large sections of the valve in the plane 5—5 of Fig. 4 but showing the valve in different positions.
Figure 5:
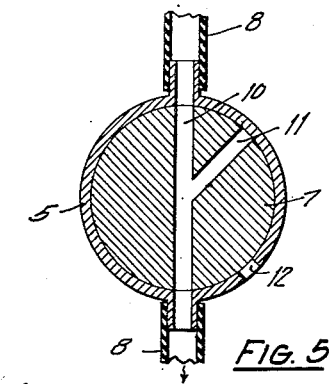

Communicating with the box 1, at one side, as shown in Fig. 1, is a pipe 4. Connected in the pipe is a valve 5, which may be a simple pet cock, and which is provided with a handle 6 for turning the plug 7 (see Figs. 5 and 6). The pipe 4 may be metal or it may be of flexible hose 8, as shown in Figs. 5 and 6. The free end 9 of the pipe is adapted to be connected to a source of vacuum such, for example, as the suction hose on a vacuum cleaner, by merely slipping the hose over the end of the pipe. The plug 7 of the valve 5 is provided with intersecting passages 10 and 11 therethrough which are adapted to place the interior of the box 1 in communication with the source of vacuum when the plug is in the position shown in Fig. 5, and to cut off communication between said source and said box and place the interior of the box 1 in communication with the atmosphere through the opening 12 in the valve housing when the plug is in the position shown in Fig. 6.

Figure 3:
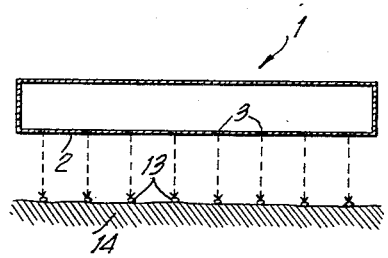
Fig. 3 is a section similar to Fig. 2 after it has been turned up-side-down and lifted from the seed bed.

In operation the plug is turned into the position shown in Fig. 5 which creates a partial vacuum within the box 1, or, at least initially draws air through the perforations 3. The seeds to be planted are then scattered over the perforated top 2 of the box 1 whereupon one of the seeds 13 will be held over each of the perforations 3 by atmospheric pressure due to the difference in air pressure between the interior of the box and the circumambient air. The box may then be tilted on its side, whereupon the seeds not retained in the perforations 3 will fall off. The box is then placed up-side-down over the seed bed 14, the vacuum is relieved by turning the valve into the position shown in Fig. 6 whereupon the seeds will drop off the seeder on the surface of the seed bed or flat, as shown in Fig. 3, where they may be covered with a light layer of soil.

Figure 2:
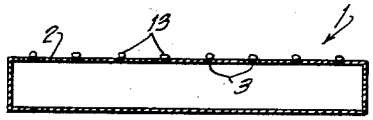
Fig. 2 is a section of Fig. 1 in the plane 2—2.

In Figs. 7 to 10, inclusive, we have shown the preferred form of our device. Here, the box may be substantially the same as the box shown in Figs. 1, 2 and 3 but for convenience in handling, it is provided with handles 15 which may be welded or otherwise secured to the imperforate side of the box as shown at 16. The bottom side 2 of the box shown in Figs. 7, 8 and 9 is provided with perforations 3 the same as the upper side of the box shown in Fig. 1.

In addition to the handles, the longitudinal edges of the perforated side of the box are provided with legs 17 which may be welded or otherwise secured thereto and which serve to support the box with the perforated side thereof held in slightly spaced relation to the seed bed or flat when the box is placed thereon.

Figure 4:
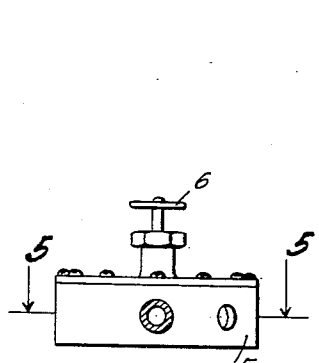
Fig. 4 is an elevation view of a valve.

Instead of having the vacuum pipe extending outwardly from one end of the box as shown in Fig. 1, we have here shown a vacuum pipe 18 as communicating with the box approximately in the center of the imperforate side together with a two-way pet cock 19 in the pipe line for releasing the vacuum. The pet cock 19 differs from the valve shown in Figs. 4, 5 and 6 merely in the fact that the air passages 20 and 21 through the plug 22 are disposed at right angles to each other instead of at an acute angle. As illustrated, the plug is in a position to allow air to be exhausted from the box by means of a vacuum pump. By turning the plug 90° in a clockwise direction, air will be admitted through the passage 23 in the casing to relieve the vacuum in the box.

From the foregoing it will be apparent that the seeds are uniformly distributed on the seed bed or flat, no seeds whatever are wasted and the operation may be performed very quickly.

By the methods now commonly practiced, a vast amount of time and labor are consumed in the transplanting of seedlings from the original sowing to flats or seed beds. Our device is designed to eliminate entirely this step of transplanting by depositing the seeds in the first instance in properly spaced relation directly in the seed beds or flats.

Furthermore, while it is most convenient to have a valve in the pipe 4, it will be apparent that where a vacuum hose is merely slipped over the end 9 of the pipe the valve might be omitted and the hose slipped on and off the pipe as required to hold the seeds on the seeder and release them therefrom.

What we claim is:

1. A device for planting seeds in a seed bed; said device comprising a comparatively flat box formed of sheet metal having a flat top provided with a multiplicity of perforations therein of a size smaller than the seeds to be planted and spaced to conform to the desired spacing of said seeds when planted but otherwise having a smooth, uninterrupted, substantially plane surface throughout, means for connecting said box to a source of vacuum for withdrawing air from the interior thereof; said box being otherwise airtight; and a valve in said connecting means for shutting off communication between the interior of said box and said source of vacuum and establishing communication between the interior of said box and the circumambient air.

2. A device for planting seeds in a seed bed; said device comprising a comparatively flat box formed of sheet metal having a flat top provided with a multiplicity of perforations therein of a size smaller than the seeds to be planted and spaced to conform to the desired spacing of said seeds when planted but otherwise having a smooth, uninterrupted, substantially plane surface throughout, means for connecting said box to a source of vacuum for withdrawing air from the interior thereof; said box being otherwise airtight; and legs projecting upwardly above the level of said perforated top for supporting said box, when inverted and placed upon said bed, with said top in slightly spaced relation to the surface of said bed.

3. A device for planting seeds in a seed bed; said device comprising a comparatively flat box formed of sheet metal having a flat top provided with a multiplicity of perforations therein of a size smaller than the seeds to be planted and spaced to conform to the desired spacing of said seeds when planted but otherwise having a smooth, uninterrupted, substantially plane surface throughout, means for connecting said box to a source of vacuum for withdrawing air from the interior thereof; said box being otherwise airtight; handles on said box for manipulating the same; and legs projecting upwardly above the level of said perforated top for supporting said box, when inverted and placed upon said seed bed, in slightly spaced relation to the surface of said bed.

References Cited in the file of this patent

UNITED STATES PATENTS

| Number | Name | Date |
|---|---|---|
| 389,485 | Russell | Sept. 11, 1888 |
| 1,526,405 | Williams | Feb. 17, 1925 |
| 2,308,209 | Schmutzer et al. | Jan. 12, 1943 |
| 2,356,136 | Wampler | Aug. 22, 1944 |
| 2,386,076 | Taylor et al. | Oct. 2, 1945 |
| 2,390,242 | Engler | Dec. 4, 1945 |
| 2,455,701 | Putnam et al. | Dec. 7, 1948 |
| 2,546,838 | Tasche | Mar. 27, 1951 |